United States Patent [19]
McCauley

[11] Patent Number: 5,936,550
[45] Date of Patent: Aug. 10, 1999

[54] SURVEILLANCE APPARATUS

[76] Inventor: Richard McCauley, 5345 Freewill Rd., Cleveland, Tenn. 37312

[21] Appl. No.: 09/179,848

[22] Filed: Oct. 28, 1998

[51] Int. Cl.⁶ ........................................... G08G 1/01
[52] U.S. Cl. ........................... 340/936; 414/227; 414/537
[58] Field of Search ................. 340/573.4, 902, 340/904, 905, 936; 414/537, 227, 253

[56]  References Cited

U.S. PATENT DOCUMENTS

| | | |
|---|---|---|
| 4,455,119 | 6/1984 | Smith . |
| 4,497,515 | 2/1985 | Appelson ................................ 296/141 |
| 4,789,281 | 12/1988 | Westerdale .............................. 410/29.1 |
| 4,854,631 | 8/1989 | Laursen . |
| 4,984,399 | 1/1991 | Taylor . |
| 5,285,604 | 2/1994 | Carlin . |
| 5,388,949 | 2/1995 | Berg ......................................... 414/480 |
| 5,601,390 | 2/1997 | Cummings . |
| 5,769,011 | 6/1998 | Daniel . |

*Primary Examiner*—Nina Tong
*Attorney, Agent, or Firm*—Kerkam, Stowell Kondracki & Clarke, P.C.; John C. Kerins

[57]  ABSTRACT

A surveillance apparatus and method for the surveillance of traffic are provided, in which the apparatus includes a housing for substantially completely enclosing and concealing a law enforcement vehicle therein, and a one-way window extending around part or nearly all of the housing, such that a vehicle operator in a vehicle inside the housing may visually monitor traffic, while the window prevents the vehicles in traffic from visually determining whether a vehicle is or is not present in the apparatus.

22 Claims, 5 Drawing Sheets

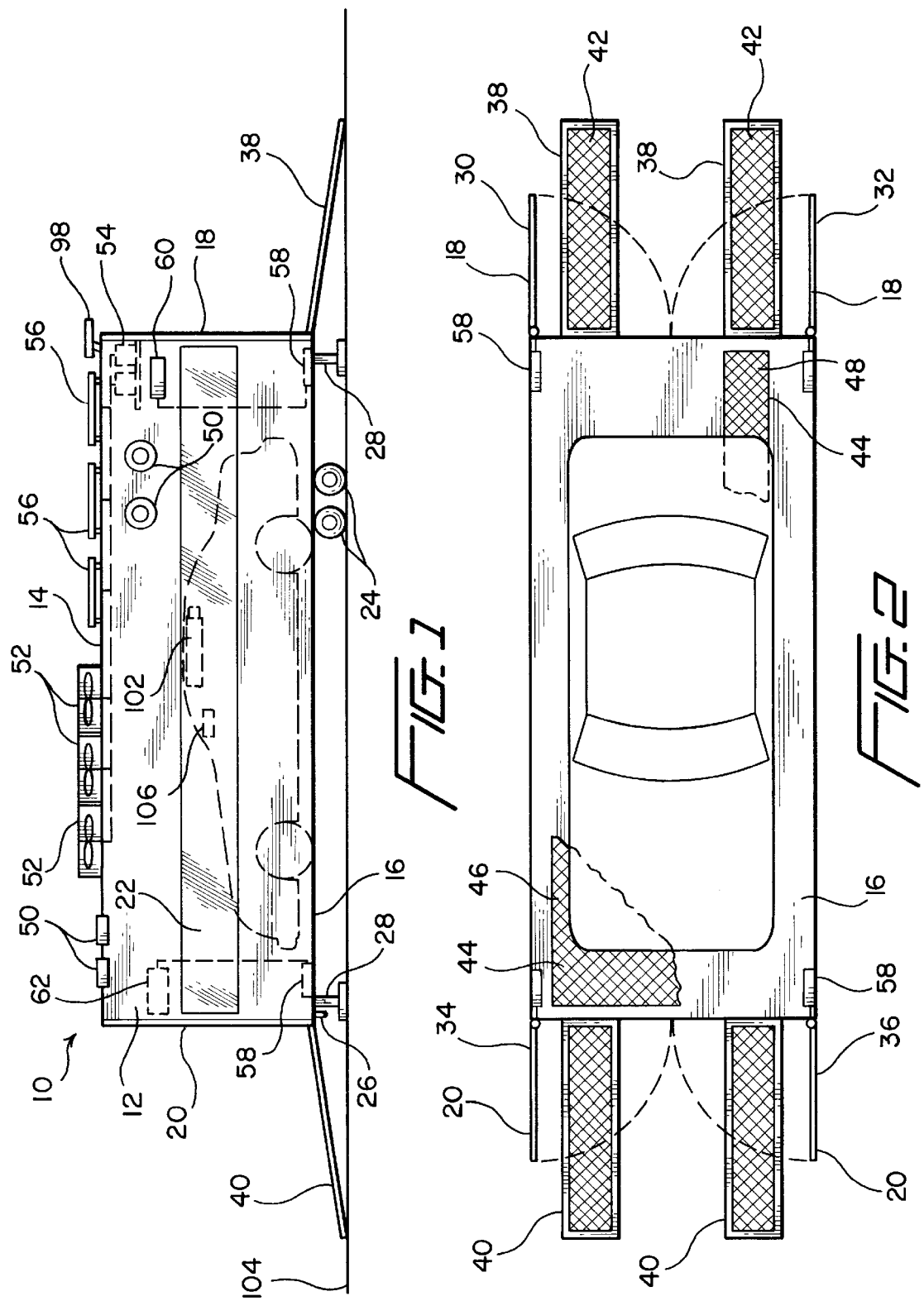

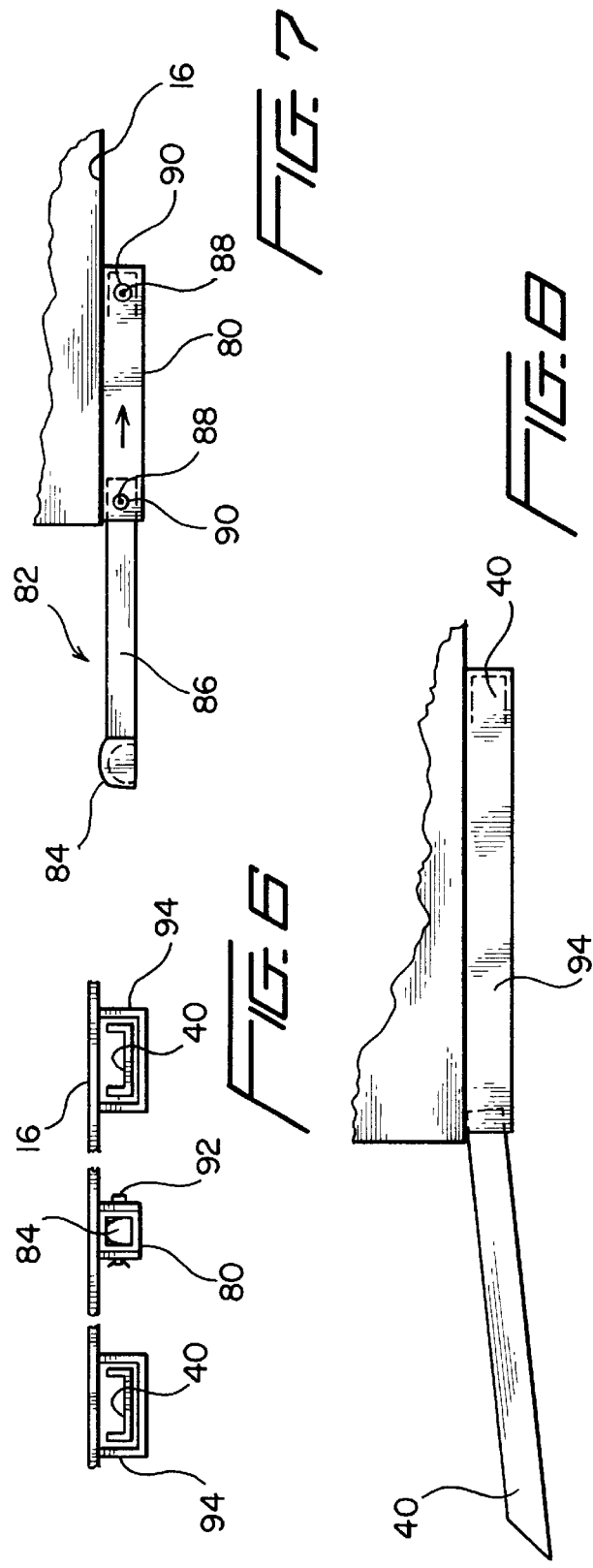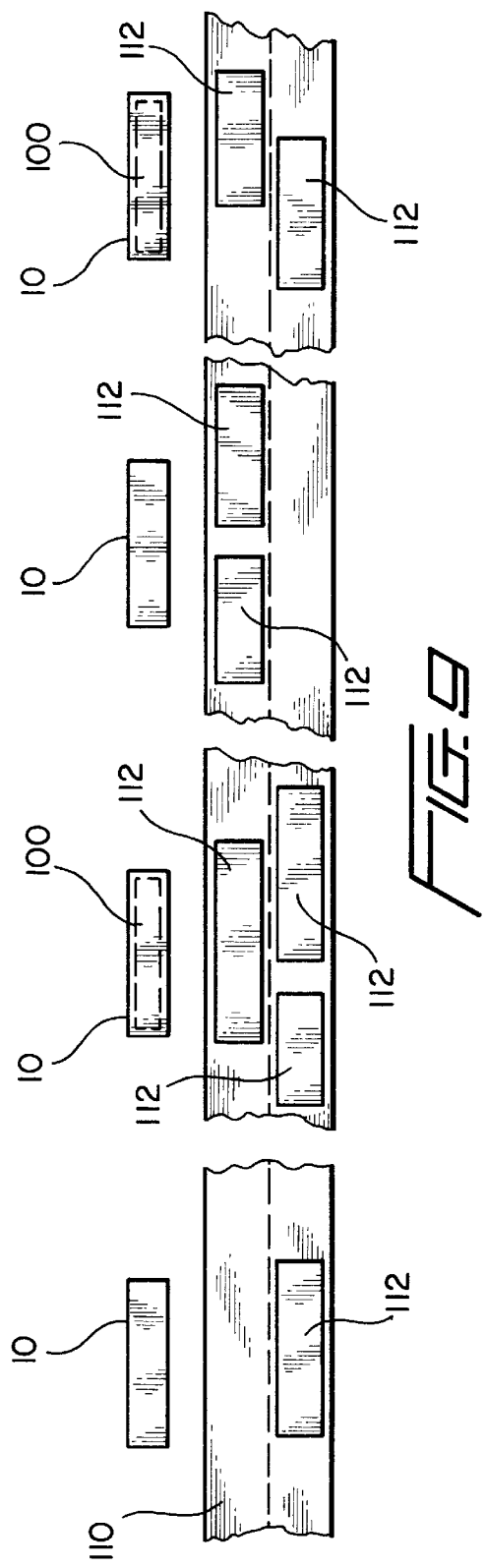

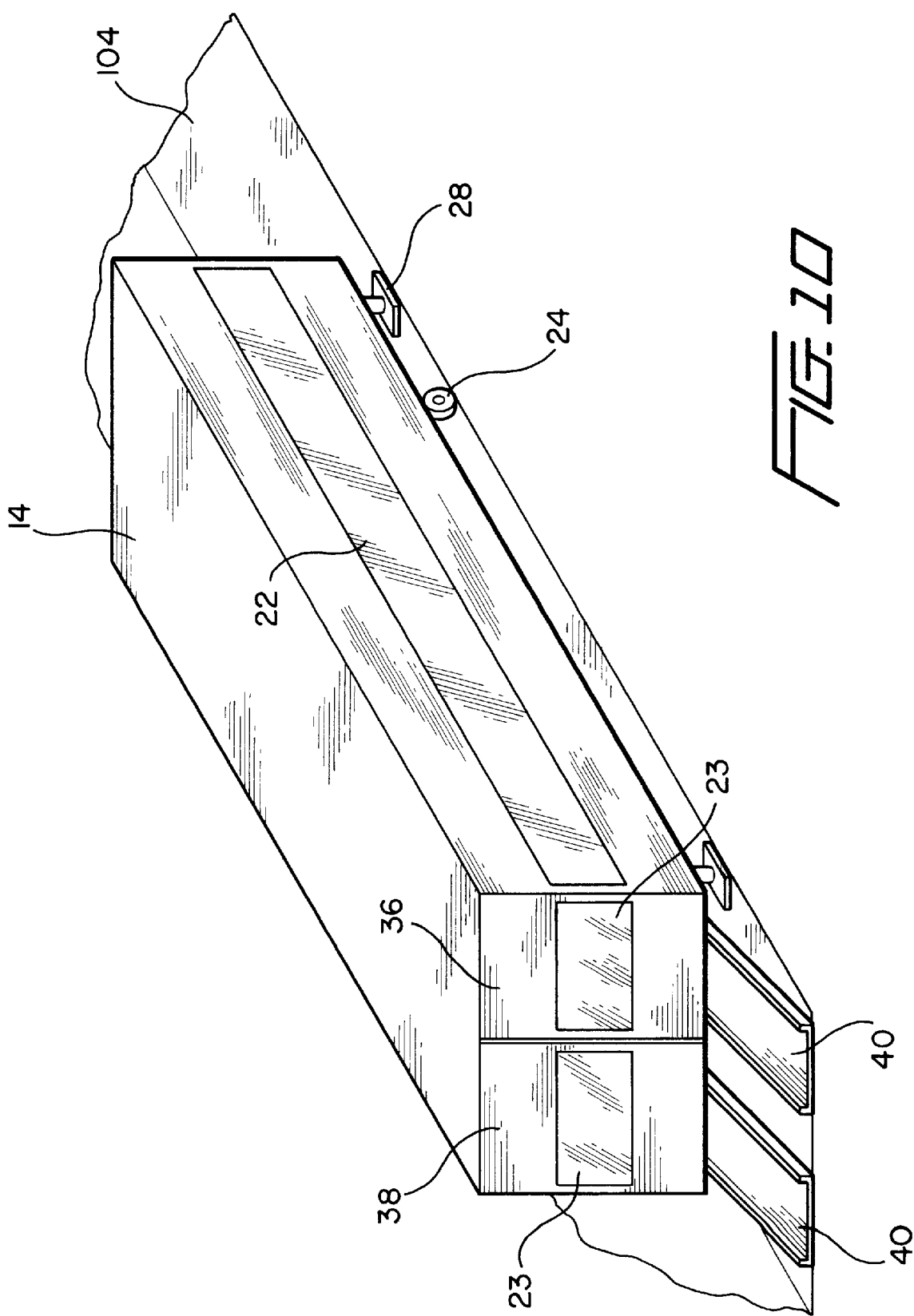

SURVEILLANCE APPARATUS

BACKGROUND OF THE INVENTION

1. Field of the Invention

The invention relates to a surveillance apparatus, and, in particular, a transportable roadside housing for a law enforcement vehicle.

2. Description of Related Art

It is a constant challenge for law enforcement agencies to institute and maintain effective programs for enforcing posted speed limits and other traffic rules on highways and other roads. The manpower necessary to continuously or even periodically monitor traffic, as by radar speed monitoring and enforcement, make this effort difficult, if not impossible, to accomplish, and only at a very high cost for equipment and personnel.

Enforcement agencies have heretofore attempted to reduce highway speeds short of setting up a fully staffed "speed trap", by, for example, parking an unoccupied police cruiser along the side of the road, or setting up an unmanned, but operating radar gun. Such measures generally may temporarily work to cause vehicle operators to slow down to speeds closer to the posted speed limit, but generally, over time, it becomes known that there is no law enforcement official associated with the set up to pursue the speeders, and the flow of traffic returns to the elevated speeds.

There is, accordingly, a continuing need for measures which will be effective, over an extended period of time, at causing drivers to travel at speeds at or closer to the posted speed limit, or, where applicable, cause drivers to obey some other traffic law which is frequently violated.

It is therefore principal object of the present invention to provide an apparatus to be used by law enforcement officials patrolling in vehicles for periodic monitoring or surveillance of traffic, wherein the apparatus effectively conceals the interior of the apparatus such that drivers can not determine whether a law enforcement vehicle is present inside the apparatus.

It is a further important object of the present invention to provide an apparatus that can temporarily house a vehicle with a running engine, and which can easily be transported to a desired roadside location.

It is an additional object of the present invention to provide a vehicle housing apparatus that can be entered at one end and exited at the other end, and which can be seen through from the interior to the exterior, but not from the exterior to the interior.

SUMMARY OF THE INVENTION

The above and other objects of the present invention are attained by providing an enclosure or housing sized to accept a vehicle therein, with the housing having an entrance door at a first end and an exit door at a second end, allowing a law enforcement vehicle to enter the housing, remain in the housing for a desired amount of time, and exit the housing traveling in the same direction as when entering the housing. The housing is equipped with one or more windows of a type that can be seen through looking from the interior of the housing to the exterior, but not vice versa. In this way, drivers of vehicles can not determine visually whether a law enforcement vehicle is present within a housing positioned along the side of a road.

The apparatus has additional features, such as a ventilation system, including an open grating covering at least a part of the floor of the apparatus, which will allow a vehicle, with its engine running, to remain in the apparatus for extended periods of time. The floor is desirably elevated from the level of the road surface, and entrance and exit ramps are provided to raise and lower the vehicle from the level of the road surface. The apparatus also is preferably equipped with at least one set of wheels, so that the apparatus can be transported to a desired location in a manner similar to towing a trailer.

BRIEF DESCRIPTION OF THE DRAWINGS

These and other features of the present invention and the attendant advantages will be readily apparent to those having ordinary skill in the art, and the invention will be more easily understood from the following detailed description of the preferred embodiments taken in conjunction with the accompanying drawings wherein like reference characters represent like parts throughout the several views.

FIG. 1 is a substantially schematic side elevation view of a temporary vehicle housing and surveillance apparatus in accordance with a preferred embodiment of the present invention.

FIG. 2 is a substantially schematic top plan view of a temporary vehicle housing and surveillance apparatus in accordance with a preferred embodiment of the present invention, with the roof of the apparatus removed to reveal the interior.

FIG. 6 is a substantially schematic end elevation view of an underside of one end of the apparatus.

FIG. 7 is a side elevation view of a trailer tongue and channel secured to an underside of the apparatus of the present invention.

FIG. 8 is a side elevation view of a ramp and a ramp storage channel secured to an underside of the apparatus of the present invention.

FIG. 9 is an overhead substantially schematic view of a roadway having a plurality of the apparatuses of the present invention positioned alongside the roadway.

FIG. 10 is a substantially schematic perspective view of the FIG. 1 surveillance apparatus.

DETAILED DESCRIPTION OF THE PREFERRED EMBODIMENTS

Figure 3:
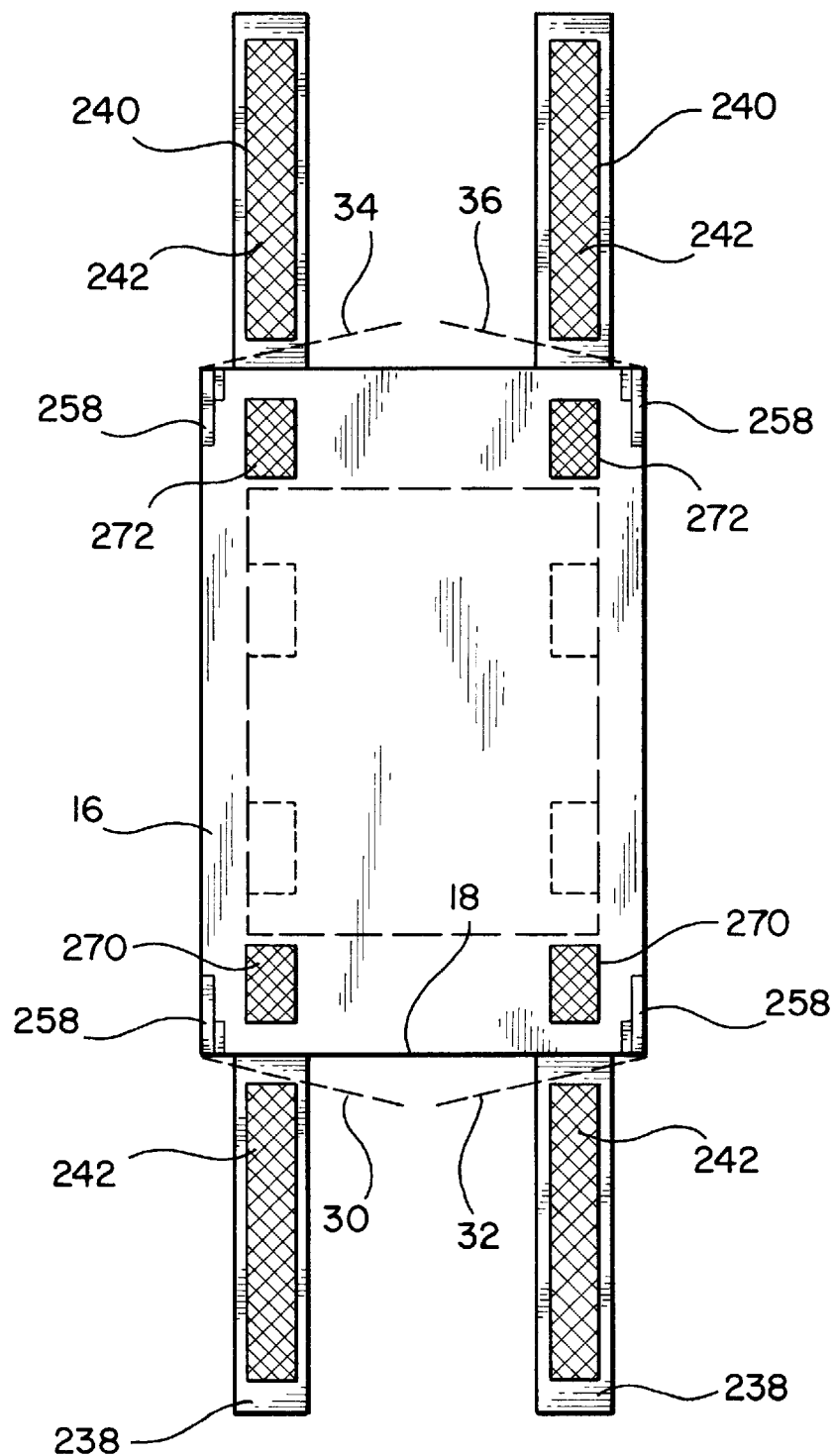
FIG. 3 is a substantially schematic top plan view of a temporary vehicle housing and surveillance apparatus in accordance with an alternative preferred embodiment of the present invention, with the roof of the apparatus removed to reveal the interior.

Referring initially to FIG. 1, a surveillance apparatus 10 is shown with a vehicle 100 illustrated (in broken lines) as being housed therein. The surveillance apparatus 10 fully encloses the vehicle, having side walls 12 (one shown), top wall or ceiling 14, bottom wall or floor 16, entrance door 18 and exit door 20.

Side walls 12 and doors 18, 20 are preferably made of a material, such as sheet steel, which can not be seen through. At least one of the side walls 12, however, is provided with a "one-way" window 22, preferably extending along substantially the entire length of the side wall, in order to permit the law enforcement officer, who is sitting in and operating the vehicle temporarily housed in the apparatus to be able to see through to the outside of the vehicle. Window 22 is preferably made of tempered glass or other safety glass, or of a rigid translucent polymeric material, an example of which is sold under the trademark PLEXIGLAS®. Because the effectiveness of the surveillance apparatus depends upon vehicle drivers not being able to readily determine whether or not a law enforcement vehicle is in the apparatus as the drivers pass by the unit (as will be discussed in greater detail), the window must not allow persons to see clearly into the interior of the apparatus. The window may therefore be a coated glass, such as a mirror coated glass, or a glass tinted to a sufficient darkness such that it can not be seen through. Tinted glass which may be suitable for use includes what is known as "limo glass", commonly used in stretch limousines to prevent the viewing of persons being transported by the limousine. Polymeric window material may be treated in the same manner.

An important criteria for the window is that it be made of a material that will permit the use of various vehicle-mounted speed detection devices, such as radar or laser guns, shown schematically at numeral 102 in FIG. 1, from within the enclosure. The placement of, and height or vertical extent of, the window should be such as to permit the vehicle driver to see out when he or she is sitting in the driver's seat, and to accommodate any divergence of the beam transmitted by the speed detection device.

It is anticipated that the apparatus will most commonly be deployed on the right-hand shoulder of a road or highway, and a window is therefore provided on the "driver's side", or left-hand side wall 12. Preferably, an identical window is provided on the opposite side wall, allowing a law enforcement agency the flexibility to position the apparatus on either side of the road, and to allow more complete visual surveillance of the area surrounding the apparatus. Also, a window or windows 23 (FIG. 10) may preferably be installed on the entrance door panels 30, 32, and/or exit door panels 34, 36, at the same height as window 22, such that the apparatus will have substantially a 360° wrap of windows for surveillance purposes.

It is also to be noted that other materials, such as a fine mesh (metal or polymer) screen, may be suitable for use as a window, in place of glass or plastic, provided the screen does not permit vehicle operators to see into the apparatus clearly enough to determine the presence or absence of a vehicle in the apparatus. The screen should also permit the proper operation of the speed detection equipment carried by the vehicle housed therein.

The term "one-way" window shall be used and defined herein to refer to a material used on the wall or walls and/or the doors, of the apparatus that permits a person disposed in the interior of the apparatus to see out to the exterior of the apparatus, but will prevent persons, such as vehicle operators, from seeing clearly into the interior of the apparatus, and which thus will prevent persons from visually determining whether or not a vehicle is present within the apparatus.

The surveillance apparatus 10 is preferably easily transportable to its desired location, and the apparatus may preferably function in the manner of a trailer, namely, it may be provided with trailering wheels 24 and a suitable trailer hitch connection 26, such that a semi-tractor or a truck may tow the unit to the desired location alongside a road. Supports 28 are preferably provided to stabilize and level the apparatus once it is in place.

In the illustrated preferred embodiment, the apparatus 10 is elevated above the level of the road 104, and the apparatus is therefore provided with entrance ramps 38 and exit ramps 40 extending between the road surface 104 and the floor 16 of the unit. As best seen in FIG. 2, the ramps 38, 40 may have a grating insert 42 to provide increased traction for the vehicle, as well as to aid in cleaning debris from the vehicle tires. The ramps 38, 40 may be delivered to the desired site with the apparatus, and installed once the apparatus is leveled and/or stabilized, as will be discussed in greater detail later.

As best seen in FIG. 2, the floor 16 of the apparatus preferably includes one or more sections of grating 44, making the floor 16 open to the exterior of the apparatus to permit ventilation of the unit and to allow water and debris falling off of the vehicle to drain or drop through the floor, keeping the interior of the apparatus as clean and dry as practicable. The grating 44 may extend substantially completely across the entire portion of the floor on which a vehicle will rest, as shown partially by grating section 46. Alternatively, the grating 44 may extend substantially only along the floor in strips corresponding to the position of the tires and vehicle side bodies, as represented by grating section 48. The grating may be affixed to support beams (not shown) which form the basic platform for the unit, and which extend around the periphery of the unit and either axially or laterally at predetermined positions within the periphery.

It is presently believed that the floor grating should provide adequate ventilation in and of itself, or in combination with passive vents 50 disposed on the roof and/or side walls of the apparatus, to remove the vehicle exhaust and to maintain a reasonable temperature in the apparatus. Alternatively, one or more fan units 52 may be supplied on the roof 14 (or side walls) of the apparatus, to draw exhaust and/or hot air out of the apparatus, thus actively generating air flow through the unit by pulling air through the floor grating. The fan units 52, if provided, may preferably be run by a bank of batteries 54 installed in the apparatus. The bank of batteries may intermittently be replaced or recharged by a maintenance crew. Alternatively, solar energy collector panels 56 may be provided on the roof of the apparatus. In that configuration, the fans may be powered directly by electricity converted from solar power, or the solar power may be converted and used to charge batteries 54.

Batteries 54 may also preferably be used to power electric motors 58 that operate (i.e., open and close) doors 18, 20. Other door opening and closing means may be used in place of the schematically shown electric motors. The electric motors 58 may alternatively be positioned near the roof or ceiling of the apparatus, if that proves to be desirable.

Where electric motors or other externally powered means are used to open the doors 18, 20, the doors may preferably be automatically opened by an operator of an authorized vehicle by providing the vehicle with a transmitter 106 that sends a coded signal to a receiver mounted on the apparatus 10, and operatively coupled to the powered door opening units 58. Since, in the preferred embodiment, it is desired to only open either the entrance door 18 or the exit door 20 (entrance door when the vehicle is to enter and exit door when the vehicle desires to exit), an entrance receiver 60 and an exit receiver 62; having separate activation codes, may be provided, and the transmitter 106 placed in the vehicle will be capable of separately transmitting each code, as determined by the driver.

Thus, as the vehicle 100 approaches the apparatus, the code for activating the entrance receiver 60 and corresponding door openers 58 is transmitted, and door panels 30, 32 are opened to admit the vehicle into the apparatus.

Once the vehicle enters the unit, the same activation code is transmitted, and the door openers 58 operate in reverse to close the door panels. The vehicle remains in the apparatus, conducting traffic surveillance, for a period of time. When the vehicle operator desires to leave the apparatus, whether in pursuit of a violator or to move on to the next assignment, the code activating the exit door openers is transmitted, the door panels 34, 36 are opened, the vehicle drives out, and the code is again transmitted to close the exit door. The closing of the entrance and exit door may alternatively be accomplished by having the doors close automatically at the end of a predetermined short time interval after the door has been opened. This feature should be especially useful for closing the exit door, as the vehicle will often have to exit in haste.

Figure 5:
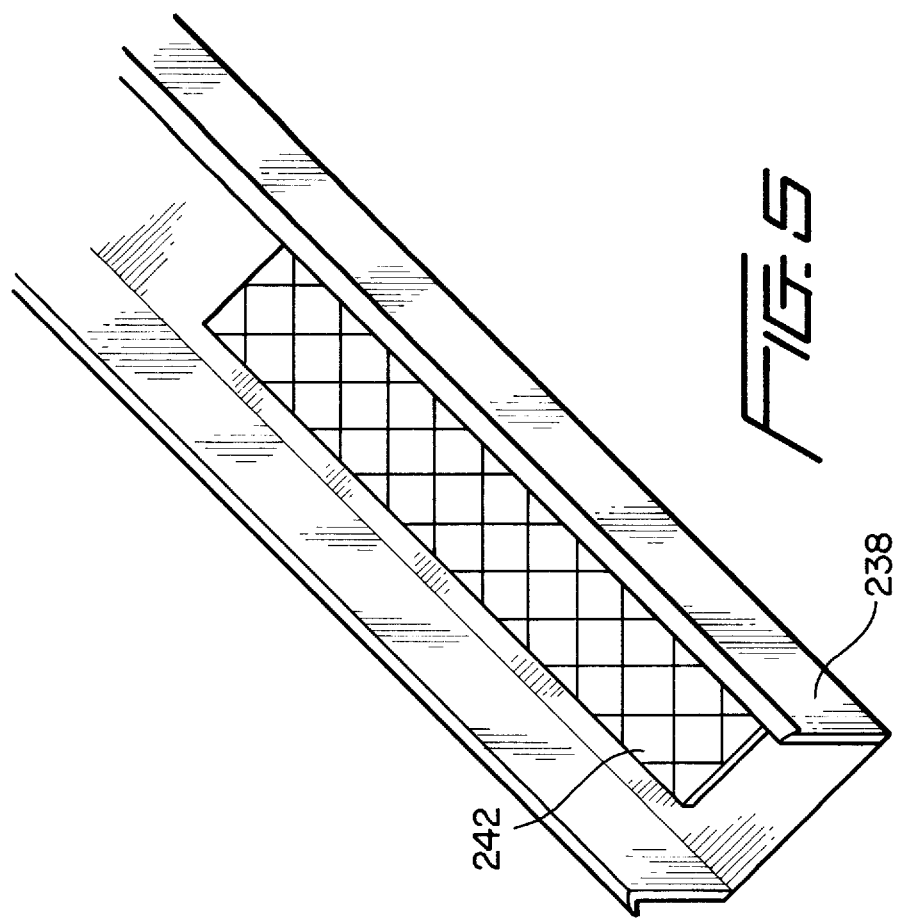
FIG. 5 is a perspective view of an entrance ramp having a pressure plate positioned thereon, in accordance with the embodiment of FIG. 3.
Figure 4:
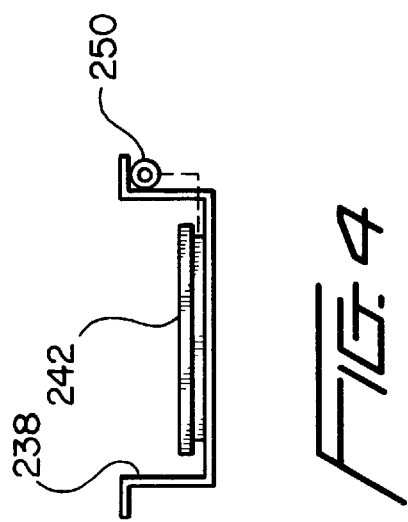
FIG. 4 is an end elevation view of an entrance ramp having a pressure plate positioned thereon, in accordance with the embodiment of FIG. 3.

An alternative door opening and closing means is envisioned for the present invention, and has the advantage that no external power source, such as the bank of batteries 54, would be required. The system is based upon the use of hydraulic or pneumatic pressure. In this alternative embodiment, as shown in FIGS. 3, 4 and 5, the entrance and exit ramps 238, 240, are provided with plate inserts 242 capable of deflecting under the weight of at least a part of a vehicle, for example, when the front wheels are disposed over the plate. When the plate inserts deflect under the weight applied by the vehicle, hydraulic fluid is displaced through a hydraulic line 250, and is used to power hydraulic door openers 258.

When the vehicle 100 approaches the apparatus and begins traveling up entrance ramps 238, the weight of the vehicle forces the ramp inserts to deflect, causing entrance door panels 30, 32 to open. Entrance pressure plates 270 are also disposed on floor 16 just inside entrance door 18, to maintain the opening hydraulic force on door 18 so that the door will remain open as the entire vehicle enters the apparatus. The entrance door will close automatically once the vehicle moves forward in the apparatus to remove weight from pressure plates 270. When the vehicle operator desires to exit the apparatus, he or she will pull the vehicle forward to apply vehicle weight to exit pressure plates 272, whereupon a second hydraulic system will operate to open door 20. As the vehicle exits, the vehicle weight remains applied to exit pressure plates 272, and then to plate inserts 242 provided on the exit ramps 40. Once the vehicle separates from ramps 40, the hydraulic system reverts to its original state, and door panels 34, 36 are closed.

FIGS. 6, 7 and 8 illustrate additional features of the present invention. FIG. 6 is a partial end-on view of the left end of the apparatus of FIG. 1, showing floor 16 and three channels which preferably are secured to an underside of floor 16. The central channel 80 houses an alternative trailering attachment, in the form of a retractable trailering tongue 82. FIG. 7 illustrates the channel and tongue in a side elevation view. Because the apparatus will generally be transported without a vehicle inside, it is expected that it will be light enough to be trailered much like a large power boat.

The trailering tongue 82 has a fixture 84 adapted to engage a ball hitch 84 commonly used on heavy trucks and other towing vehicles. Fixture 84 is secured to the tongue bar 86. The tongue bar 86 has, at an end opposite fixture 84, a pinning device, which, in the illustrated preferred embodiment, comprises a bore 88 extending laterally through bar 86, which can be aligned with two (or more) sets of bores 90 extending through channel 80. The tongue bar 82 may thus be fixedly secured at an extended position (shown) and at a retracted position (partially shown in broken lines) within channel 80, by securing a pin 92 through the aligned tongue bar bore 88 and a set of channel bores 90. The securing of the pin may be effected in any of several commonly-employed manners, including using a nut on a threaded end of the pin, or a cotter pin extending through a bore in an end of the pin itself.

FIGS. 6 and 8 illustrate a second type of channel secured to and extending below floor 16 of the apparatus. Ramp channels 94 are disposed at the desired spacing at both ends of the apparatus (left end of FIG. 1, shown), and carry entrance and exit ramps 38, 40 therein during transport of the apparatus. Upon positioning and stabilizing of the apparatus, the ramps are pulled into their extended positions (FIG. 8) to ready the apparatus for vehicle access. The end of the ramp closest to the enclosure may be either secured inside the channel, or removed and secured to the floor 16 of the apparatus, in known, conventional ways. The ramps may also be secured in their retracted positions for transport, in any known, conventional manner. In the embodiment wherein the ramps have deflection plates provided thereon, the hydraulic connections may either be effected after the ramps are placed in operating position, or the hydraulic lines will be of sufficient length and flexibility to be able to move with the ramps between the retracted and extended positions.

Returning back to FIG. 1, it will be realized that, while the apparatus 10 has been described as having specific entrance and exit doors and ramps, the apparatus is essentially identical in function at each end, and the apparatus may be placed into use facing the opposite direction, i.e., with trailer hitch 26 facing the rear, with that end serving as the entrance side. Likewise, the apparatus 10 can be entered via the exit ramps 40, and exited via the entrance ramps 38, if a law enforcement vehicle has a need to do so.

The unit 10 may indeed be equipped with only a single door (single set of door panels) and a single set of ramps, such that the law enforcement vehicle will enter and exit at the same end of the apparatus. In this embodiment, the vehicle will either enter in a forward direction and back out, or will back in and exit in a forward direction. This embodiment eliminates the highly advantageous ability to enter and then exit while traveling in the same direction, normally in the same direction as traffic flow, but may have useful application in other traffic scenarios, such as being placed in the vicinity of an intersection such that a law enforcement officer can monitor and enforce traffic signal violations.

In addition, while it is believed to be highly advantageous to construct the apparatus in a manner that it can be transported like a trailer, the apparatus can be constructed such that it can be transported and positioned from a flat bed truck, such that the apparatus itself will not have wheels and may sit on the road surface itself, once maneuvered into position off of the flat bed carrier.

Alternatively, the monitoring or surveillance apparatus need not necessarily be transportable, and may be erected in place on a road shoulder surface or on a poured slab, for example.

The method of conducting traffic surveillance and of enforcing traffic laws in accordance with the present invention will be best understood from the schematic illustration in FIG. 9. The method involves placing one or more (four shown) of the surveillance apparatuses 10 in close proximity to a roadway 110, for example, an interstate highway. The method further includes positioning a vehicle carrying a law enforcement officer within the apparatus on an intermittent basis, and having the law enforcement officer monitor a traffic flow to detect violations of traffic laws. The method further includes periodic enforcement of the traffic laws by issuance of appropriate citations by the law enforcement officer who has detected a violation of a traffic law while being stationed in the surveillance apparatus.

The specific scenario illustrated in FIG. 9 involves placing a plurality (four shown) of the surveillance units 10 according to the present invention along a length or stretch of roadway, such as an interstate highway, over which it is desired to contain speeds. As seen in FIG. 9, two of the surveillance units 10 have a law enforcement vehicle inside. This fact, however, is not known to the vehicles 112 traveling along the highway 110, because they can not see whether a vehicle is or is not present in any of the surveillance units.

Intermittent staffing of these surveillance units and periodic enforcement actions by vehicles stationed in the units will have the effect of lowering the speeds of the vehicles to at or near (or as close or reasonably can be expected) the posted speed limit, because, over an extended stretch of road, the vehicles will not know whether surveillance is actively taking place.

The use of this apparatus and method effectively curtails the use of CB radios, for example, to alert drivers approaching the stretch of road that there is an active speed trap in that area. Such communication between drivers has the effect of achieving an overall speed reduction only in the immediate vicinity of the speed trap, with high speeds being resumed immediately after passing the conventional speed trap. With the apparatus and method of the present invention, such driver tactics cannot be employed over the stretch of road, and only after passing the last of the units can the vehicle "safely" (i.e., without risk of being ticketed) resume the excessive speeds.

Further, while radar detectors may, to some extent, retain their effectiveness in aiding drivers in exceeding posted speed limits, the driver is still faced with something of a guessing game as to whether the detected radar is in a unit ahead of the vehicle or in a unit behind the vehicle. In addition, although more costly to operate, each of the apparatuses may be equipped with a speed detecting gun 98, which can be placed in active operation on all of the units, for example, during peak travel times, regardless of whether enforcement vehicles are in one or more of the units. This will clearly impair the effectiveness of radar detectors in aiding drivers to drive at increased speeds.

The foregoing description includes various details and particular features according to preferred embodiments of the present invention, however, it is to be understood that this is for illustrative purposes only. Various modifications and adaptations may become apparent to those having ordinary skill in the art, which modifications and adaptations do not depart from the spirit and scope of the present invention. For example, various door configurations and door opening systems may be employed in place of the type of doors and door openers illustrated. Accordingly, the scope of the present invention is to be determined by reference to the appended claims.

What is claimed is:

1. A surveillance apparatus comprising:
 a housing adapted to enclose a vehicle and to conceal said vehicle from being viewed from an exterior of said housing at least at street level, said housing comprising at least a floor, a wall member and a door, said door having an open position defining an opening large enough for said vehicle to enter into an interior of said housing and a closed position wherein said door substantially completely closes off said opening and said interior of said housing from an exterior of said housing;
 means for opening and closing said door, said means being operable to open and close said door without the need for an operator of said vehicle to exit said vehicle; and
 said wall comprising a one-way window enabling a vehicle operator, seated in a vehicle within the interior of the apparatus, to see out of the apparatus.

2. A surveillance apparatus as recited in claim 1, further comprising a one-way window disposed in said door at a height enabling a vehicle operator, seated in a vehicle within the interior of the apparatus, to see out of the apparatus through said one way window.

3. A surveillance apparatus as recited in claim 2, wherein said housing has one-way window panels extending substantially completely around said housing.

4. A surveillance apparatus as recited in claim 1, wherein said housing has a longitudinal extent, and wherein said door is a first door positioned at a first end of said longitudinal extent of said housing.

5. A surveillance apparatus as recited in claim 4, wherein said housing has a second door positioned at a second end of soft longitudinal extent of said housing, opposite said first end.

6. A surveillance apparatus as recited in claim 5, wherein said first door and said second door each comprises a first and a second door panel pivotably secured to said housing.

7. A surveillance apparatus as recited in claim 6, wherein said housing comprises first and second substantially vertically disposed side walls spaced apart at a predetermined distance, and extending along said longitudinal extent of said apparatus, and wherein said first and second door panels of said first and second doors are pivotably secured to vertical edges of said first and second side walls.

8. A surveillance apparatus as recited in claim 5, further comprising means for supporting said housing in an elevated position above a ground surface, wherein said floor of said housing is spaced apart from said ground surface.

9. A surveillance apparatus as recited in claim 8, further comprising a first ramp and a second ramp, said first ramp being positioned adjacent said floor and said first door and said second ramp being positioned adjacent said floor and said second door, each of said first and second ramps extending from a level at which said floor is positioned to a ground surface level.

10. A surveillance apparatus as recited in claim 9, wherein each of said first and second ramps comprises a pair of spaced-apart vehicle wheel engaging ramps.

11. A surveillance apparatus as recited in claim 1, further comprising means for supporting said housing in an elevated position above a ground surface, wherein said floor of said housing is spaced apart from said ground surface.

12. A surveillance apparatus as recited in claim 11, wherein said floor of said housing comprises, at least in part, a grating open to an external atmosphere.

13. A surveillance apparatus as recited in claim 12, wherein said wall of said housing further has at least one vent disposed therein, to permit air to circulate between the interior of said housing and an external atmosphere.

14. A surveillance apparatus as recited in claim 11, further comprising at least one ramp extending from a position adjacent to said door and adjacent to said floor of said housing, to said ground surface, said at least one ramp being so constructed and arranged to permit a vehicle to travel thereon in entering said housing.

15. A surveillance apparatus as recited in claim 1, further comprising trailering wheels secured to an underside of said housing.

16. A surveillance apparatus as recited in claim 15, wherein said floor has a retractable trailering tongue housed in a channel extending underneath said floor, wherein said tongue and said channel are so constructed and arranged to be capable of being secured in an extended position and in a retracted position.

17. A surveillance apparatus as recited in claim 1, wherein said door opening and closing means comprises means responsive to a weight of a vehicle disposed thereon to actuate a hydraulic door opening and closing system, whereby no external power source is required to open and close said door.

18. A surveillance apparatus as recited in claim 1, wherein said door opening and closing means comprises means responsive to a weight of a vehicle disposed thereon to actuate a pneumatic door opening and closing system, whereby no external power source is required to open and close said door.

19. A method for surveillance of traffic and enforcement of traffic laws, comprising:

placing a surveillance apparatus comprising a housing adapted to fully enclose and conceal therein an enforcement vehicle, at a predetermined desired position near a roadway;

periodically positioning an enforcement vehicle operated by an enforcement officer in said surveillance apparatus;

monitoring traffic from said surveillance apparatus; and periodically enforcing traffic laws as necessary or as desired, by issuing appropriate violation citations as a result of violations detected by said monitoring.

20. A method as set forth in claim 19, further comprising:

placing a plurality of said surveillance apparatuses at desired spacings along a predetermined length of roadway; and periodically positioning one or more enforcement vehicles operated by enforcement officers in one or more of said surveillance apparatuses.

21. A surveillance apparatus as recited in claim 1, wherein said housing further includes a roof extending across a top of said wall and said door to fully enclose a vehicle.

22. A surveillance apparatus as recited in claim 1, wherein said wall comprises a one-way window extending along a predetermined portion of said wall at a height enabling said vehicle operator to see out of the apparatus, and further comprises a portion made of a material that cannot be seen through from either side thereof.

* * * * *